Sept. 15, 1936.   H. L. WALKER   2,054,456
SCALE
Filed May 5, 1932   2 Sheets-Sheet 1
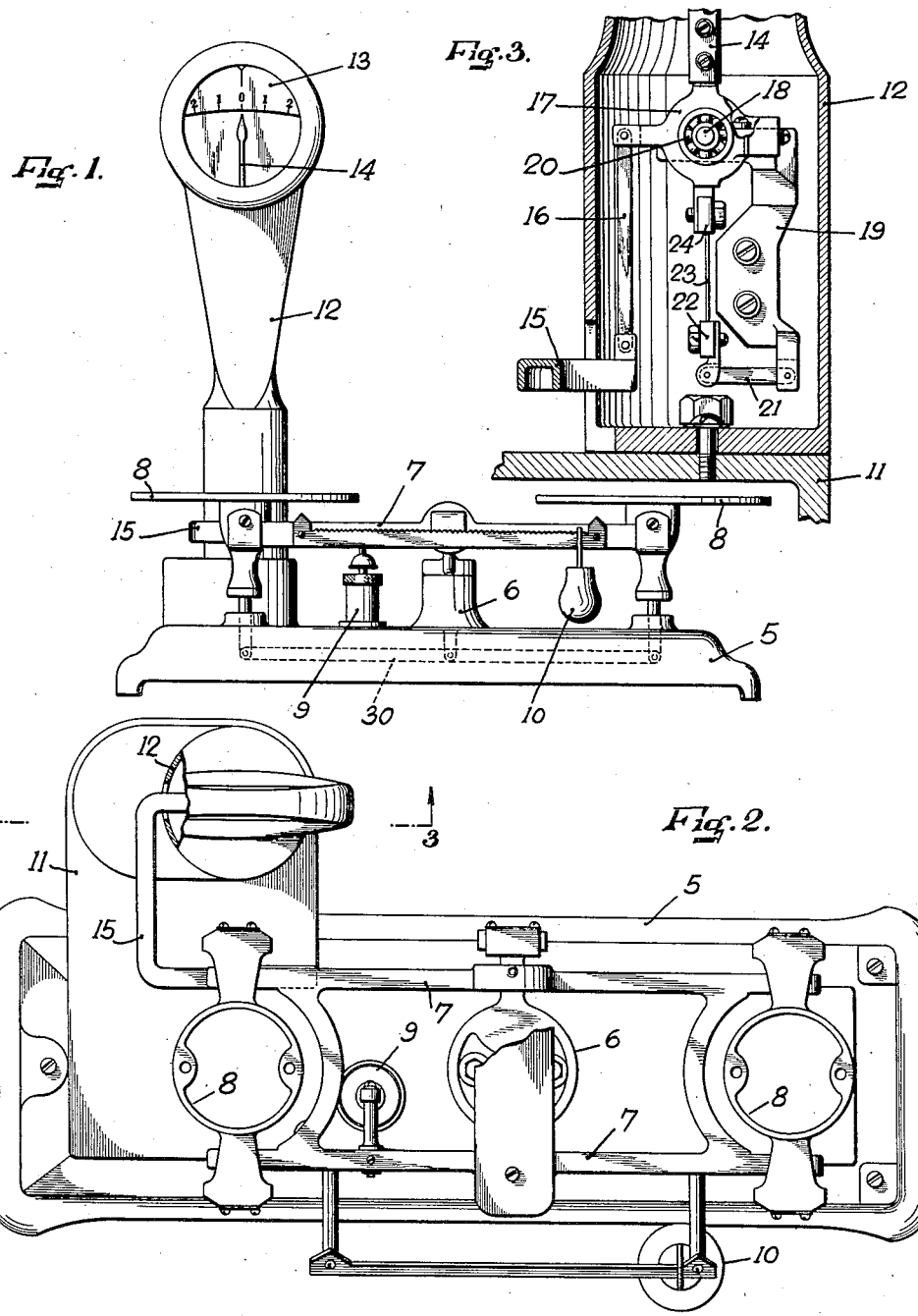
INVENTOR.
HAROLD WALKER,
BY Duell, Dunn & Anderson.
ATTORNEYS.

Sept. 15, 1936.   H. L. WALKER   2,054,456
SCALE
Filed May 5, 1932   2 Sheets-Sheet 2

INVENTOR.
HAROLD WALKER
BY Duell, Dunn & Anderson
ATTORNEYS.

Patented Sept. 15, 1936

2,054,456

UNITED STATES PATENT OFFICE 2,054,456

SCALE

Harold L. Walker, Brooklyn, N. Y., assignor to The Jacobs Bros. Co. Inc., Brooklyn, N. Y., a corporation of New York Application May 5, 1932, Serial No. 609,367

9 Claims. (Cl. 265—59)

This invention relates to a functionally and structurally improved scale embodying relatively few parts, each individually simple and rugged in construction, such parts being capable of ready assemblage and "set-up" to furnish a scale operating over long periods of time with freedom from difficulties.

An object of the invention is that of furnishing a mechanism of this character in which, as afore brought out, the parts may be correlated, one to the other, with facility, and in which, when the mechanism has been "trued up", there will be little if any likelihood of its accidentally reaching a non-adjusted condition. By means of the present invention, however, if after a long period of service such adjustment becomes necessary, this may be achieved by a scale operator with minimum of effort and expenditure of time.

A further object of this invention is that of furnishing a scale of the under and overweight type and in which the registering mechanism may be readily viewed, aside from the fact that according to one aspect of the invention such registering mechanism may be connected to the scale in a novel manner and whereby inequalities of weight value will become readily apparent to the operator.

With these and other objects in mind, reference is had to the attached sheets of drawings illustrating one practical embodiment of the invention and in which:

Fig. 1 is a side elevation of a scale;

Fig. 2 is a plan view thereof;

Fig. 3 is an enlarged fragmentary sectional view taken along the lines 3/3 and in the direction of the arrows of Fig. 2;

Figure 4:
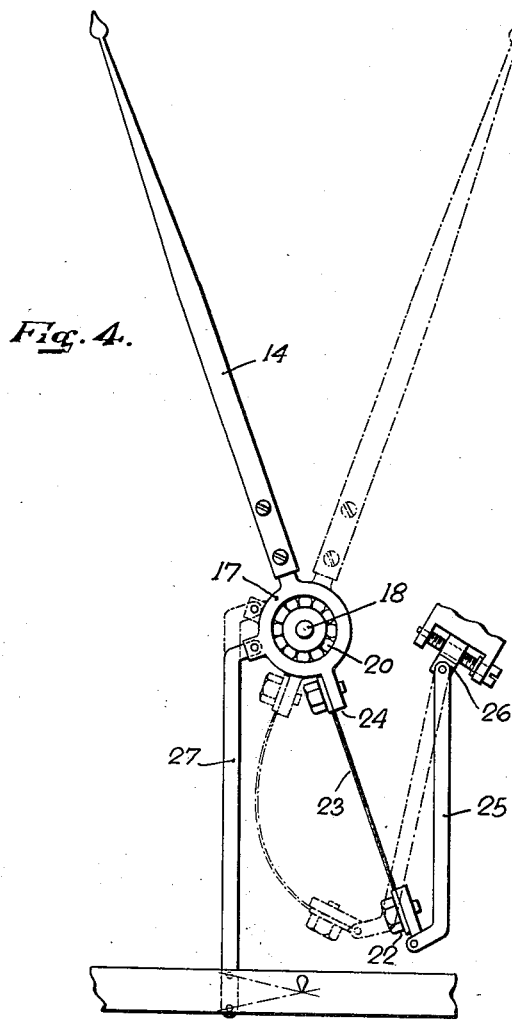
Fig. 4 is a fragmentary side view of the mechanism involved in a fan type scale and Fig. 5 is a sectional view of the dash pot.

In Figs. 1 and 2 a scale of the "even beam" type has been shown. In Fig. 4 a "fan type" scale has been illustrated. It will hereinafter be obvious that the teachings of the present invention might be embodied in numerous forms of scale, and that the detailed structures might be modified according to the scale types in which they are embodied.

Thus, referring to Figs. 1 and 2, the numeral 5 indicates the scale base from which a standard 6 extends upwardly. Mounted upon suitable bearings (not shown) by this standard, is a beam 7 with which article-supporting pans or members 8 are associated. In the usual manner this scale may be provided with a dash pot 9 and may have a poise weight 10 suitably coupled to its beam.

According to one aspect of the invention, it is desired to provide a scale of the over and underweight type in which the registering mechanism will be disposed towards one end of the beam. With this in mind, and as has been shown in Fig. 2, the base 5 may be extended as at 11 to provide a suitable supporting surface for a tower 12 disposed adjacent one of the supports 8. The tower mounts a registering mechanism comprising, in the embodiment illustrated, a stationary dial 13, the graduations of which are traversed by a pointer 14, and the mechanism for coupling this pointer to the beam—to indicate conditions of non-balance of the latter—may be connected to an extension in the form of a rod 15 which is integral with or rigidly secured to the beam 7.

Thus, with mechanism suitably resisting movement of the beam beyond an even balance condition, it is apparent a scale is furnished which will conveniently and clearly indicate the relative position of the beam and the weight value which contributes to the improper condition of over or underweight. This will be true due to the offset position of the registering mechanism and the manner in which the operator may consequently view the same, whether this mechanism has movement in a plane parallel to the beam (as shown) or whether this movement occurs in a plane at an angle to the plane of beam movement.

In order to provide a suitable movement resisting mechanism, it is obvious that various forms of apparatus might be employed. It is preferred, however, that the mechanism shown in Fig. 3 be utilized, it being apparent in this connection that this mechanism is not necessarily limited to use in connection with a scale of the specific form shown in Figs. 1 and 2. In the view in question the numeral 15, as afore brought out, indicates the beam extension to which one end of a link 16 is pivotally connected, the opposite end of such link being similarly connected to one arm of a bellcrank lever 17. This lever is mounted upon a shaft 18 supported by a bracket 19 secured to the inner face of the housing or tower 12. Antifriction means in the nature of a ballbearing 20 is interposed between the hub of the bellcrank lever and the shaft, and thus these elements are free to rotate with respect to each other.

The pointer 14 is, in the present embodiment, secured to move with the bellcrank lever 17 and, for the sake of economy in manufacture, a link 21 has one of its ends pivotally secured to the bracket 19 instead of directly or to any other support extending from the housing 12. The opposite end of the link 21 is coupled to a clamp 22 which supports the lower end of a flexion strip 23. The upper end of this strip is similarly clamped as at 24 and connected to the bellcrank lever. In this manner it will be apparent that a structure is provided which will serve to resist movement of the beam from horizontal condition and that the degree of this resistance will accurately be registered, thus showing the inequality in weight values of articles placed upon the pans or supports 8. Moreover, the degree of this movement will be greatly magnified and the scale need not be placed upon a perfectly horizontal surface in order to accurately achieve proper weighing.

It will, moreover, be observed that as the beam rocks, the movements thereof are transmitted to the bellcrank lever in greatly magnified condition. While this is true in the movement illustrated, due to the fact that coupling occurs at one end of the beam, it will nevertheless be observed that if this does not follow, sufficient movement may be secured by properly proportioning the parts. In any event, as the bellcrank lever rocks, the strip 23 will be flexed, and due to the fact that the lower end of the latter may shift—because of the link 21—it will be apparent that there will be no binding or distorting tendency which might otherwise result in the scale being thrown out of true. The scale, moreover, will have a free and easy action and will readily resist beam movements beyond even balance condition to an adequate extent.

It will be apparent that the link 21 need not be at right angles to the axis of the flexion member. This has been indicated at 25 in Fig. 4. Also, the end of the link may be mounted—as for example, on an adjustable block 26—so that its position is not flexed. In this manner it is possible to adjust the parts so that the desired results are achieved, and regardless of whether the link member extends as shown in Fig. 4, or as illustrated in Fig. 3. Of course, where the link is located as in Fig. 4, it is feasible with this adjustment to shift the end of the link so that equal up-thrusts upon the same result in equal increments of weight registration.

It is of course apparent that a construction such as shown in Fig. 4 may be utilized to advantage in connection with a "fan type" scale and the link 27 may be connected as shown in Figs. 1 to 3, or may be attached at any desired point to the beam. Regardless of the point of connection, however, it will be apparent that in this construction the flexion strip will arc, and as indicated in dotted lines, the link 25 will permit shifting of the parts as strain is imposed. In this manner it is feasible to have a longer travel on the part of the indicator arm or point 14 without exceeding the elastic limits of the flexion member.

Figure 5:
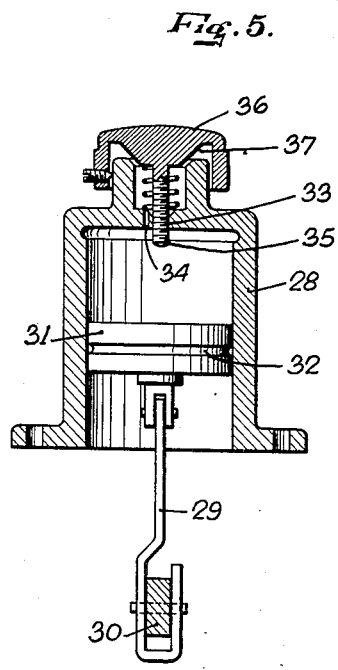

Referring to Fig. 5, it will be observed that the dash pot may include, for example, a casing 28 mounted upon the base 5 of the scale, and from which a link 29 extends to be coupled to the check rod or toggle bar 30 of the scale. The upper end of the link 29 is pivotally secured to a piston 31 moving within the casing 28 and this piston is preferably formed of graphite or similar material and has a central groove 32 which prevents binding of the parts without, however, permitting of the ready escape of fluid past the piston. The upper end of the casing 28 may terminate in an opening providing a valve seat 33 to one side of which a bleeder passage 34 is provided. A screw threaded stem 35 has connection with the correspondingly formed bore of the opening 33 and the stem 35 is mounted by a cap 36 which has a valve portion 37, the auxiliary to the outer end of the stem 35 and which cooperates with a further seat forming a part of the casing, and likewise, auxiliary to the seat provided at 33.

Thus, among others, the several objects of the invention, as afore brought out, are achieved. It will, moreover, be appreciated that numerous changes in construction and rearrangements of the parts might be resorted to without departing from the spirit of the invention as defined by the claims.

Having described my invention, what I claim as new and desire to secure by Letters Patent is:

1. A scale including a rockingly mounted beam, means for registering over and underweight positions of said beam, a flexion strip, means for connecting one end of said strip to said beam, a link having one of its ends pivotally connected to the opposite end of said strip and means for shiftably mounting said link.

2. A scale including, in combination, a base, a beam rockingly supported thereby, means connected to said base and movable with respect thereto during beam-movement, and a resilient means connected to said last named means and beam respectively for normally maintaining the latter in predetermined position with respect to said base.

3. A scale including, in combination, a base, a beam rockingly supported thereby, means connected to said base and movable with respect thereto during beam-movement, a resilient means connected to said last named means and beam respectively for normally maintaining the latter in predetermined position with respect to said base, and registering means connected to said beam for registering the amount of deflection of the latter from such predetermined position.

4. A scale including, in combination, a base, a beam rockingly supported thereby, means connected to said base and movable with respect thereto during beam-movement, and a normally untensioned strip of material having resilient properties, one end of said strip being connected to said last named means, its opposite end being connected to said beam to resist movements of the latter to either side of a predetermined position.

5. A scale including, in combination, a base, a beam rockingly supported thereby, means connected to said base and movable with respect thereto during beam-movement, a strip of material having resilient properties, one end of said strip being connected to said last named means, its opposite end being connected to said beam to resist movements of the latter from a predetermined position, and registering means connected to said beam for measuring the amount of beam-movement in advance and beyond such predetermined position.

6 A scale including, in combination, a base, a beam rockingly supported thereby, means connected to said base and movable with respect thereto during beam movement, and a flexion strip having one of its ends connected to said last named means, its opposite end being connected to said beam.

7. A scale including, in combination, a base, a beam rockingly supported thereby, a flexion strip having one of its ends connected to said beam to normally maintain the same in a predetermined position, means for registering movements of such beam to either side of such position, a mounting member connected to the opposite end of said strip, and means adjustable with respect to said base and movably supporting such mounting member.

8. A scale including, in combination, a base, a beam rockingly supported thereby, a flexion strip having one of its ends connected to said beam to normally maintain the same in a predetermined position, means for registering movements of such beam to either side of such position, a mounting member connected to the opposite end of said strip, a link having one of its ends connected to the mounting member and means for movably connecting the other end of said link to said base whereby such link rocks during beam-movements.

9. A scale including, in combination, a base, a beam rockingly mounted thereby, a registering mechanism disposed adjacent one end of said beam and connected thereto to indicate the movements of such beam, a flexion strip having one of its ends connected to said registering mechanism and tending normally to maintain such beam in a predetermined position, and means rockingly connected to such base and also connected to the opposite end of such flexion strip, such latter means shifting automatically during movements of such beam.

HAROLD L. WALKER.